United States Patent
Lavid Ben Lulu et al.

(10) Patent No.: US 11,442,444 B2
(45) Date of Patent: Sep. 13, 2022

(54) SYSTEM AND METHOD FOR FORECASTING INDUSTRIAL MACHINE FAILURES

(71) Applicant: Aktiebolaget SKF, Gothenburg (SE)

(72) Inventors: David Lavid Ben Lulu, Nesher (IL); Nir Dromi, Nahalal (IL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/167,243

(22) Filed: Feb. 4, 2021

(65) Prior Publication Data

US 2021/0157310 A1    May 27, 2021

Related U.S. Application Data

(63) Continuation of application No. PCT/US2019/045869, filed on Aug. 12, 2019.

(60) Provisional application No. 62/717,853, filed on Aug. 12, 2018.

(51) Int. Cl.
  *G05B 23/02* (2006.01)
  *G06N 20/00* (2019.01)

(52) U.S. Cl.
  CPC ......... *G05B 23/0283* (2013.01); *G06N 20/00* (2019.01)

(58) Field of Classification Search
  CPC ............ G05B 19/4184; G05B 23/0254; G05B 23/0283; G06N 20/00; G06N 3/0445; G06N 3/0454; G06N 3/08; G06N 5/003; G06N 7/005; Y02P 90/02
  See application file for complete search history.

(56) References Cited

U.S. PATENT DOCUMENTS

| | | |
|---|---|---|
| 5,566,092 A | 10/1996 | Wang et al. |
| 2005/0043922 A1 | 2/2005 | Weidl et al. |
| 2013/0030765 A1 | 1/2013 | David |
| 2018/0210426 A1 | 7/2018 | Cella et al. |
| 2018/0284737 A1* | 10/2018 | Cella .................. G01M 13/045 |
| 2019/0277913 A1* | 9/2019 | Honda .................. G06N 20/00 |

OTHER PUBLICATIONS

The International Search Report and The Written Opinion of the International Searching Authority for PCT/US2019/045869, dated Dec. 19, 2019, ISA/RU, Moscow, Russia.

* cited by examiner

*Primary Examiner* — Roy Y Yi
*Assistant Examiner* — Geoffrey T Evans
(74) *Attorney, Agent, or Firm* — M&B IP Analysts, LLC

(57) ABSTRACT

A system and method for forecasting failures in industrial machines, including: receiving raw sensory inputs collected from at least one machine; generating a plurality of data features based on the raw sensory inputs; selecting from the plurality of data features a plurality of indicative data features, wherein the selection is based on a distribution of the plurality of indicative data features that determines an association between the plurality of indicative data features and a machine failure; selecting, based on the plurality of indicative data features, a machine learning model; applying the selected machine learning model to the plurality of indicative data features; and determining a probability for a forthcoming machine failure.

19 Claims, 9 Drawing Sheets

SYSTEM AND METHOD FOR FORECASTING INDUSTRIAL MACHINE FAILURES

CROSS-REFERENCE TO RELATED APPLICATIONS

This application is a continuation of International Application No. PCT/US2019/045869, filed Aug. 9, 2019, which claims the benefit of U.S. Provisional Application No. 62/717,853 filed on Aug. 12, 2018, the contents of which are hereby incorporated by reference.

TECHNICAL FIELD

The present disclosure relates generally to maintenance systems for machines, and more specifically to monitoring machine operations for improving machine processes.

BACKGROUND

Communications, processing, cloud computing, artificial intelligence, and other computerized technologies have advanced significantly in recent years, heralding in new fields of technology and production. Further, many of the industrial technologies employed since or before the 1970s are still in use today. Existing solutions related to these industrial technologies have often seen only minor improvements, merely increasing production and yield slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs when a machine deviates from correct service. Errors, which are typically deviations from the correct state of the machine, are not necessarily failures, but may lead to and indicate potential future failures. Besides failures, errors may otherwise cause unusual machine behavior that may affect performance.

The average failure-based machine downtime for typical manufacturers (i.e., the average amount of time in which production shuts down, either in part or in whole, due to machine failure) is 17 days per year, i.e., 17 days of lost production and, hence revenue. In the case of a typical 450 megawatt power turbine, for example, a single day of downtime can cost a manufacturer over $3 million US in lost revenue. Such downtime may have additional costs related to repair, safety precautions, and the like.

In energy power plants, billions of US dollars are spent annually on ensuring reliability. Specifically, billions of dollars are spent on backup systems and redundancies utilized to minimize production downtimes. Additionally, monitoring systems may be utilized to identify failures quickly, thereby speeding up the return to production when downtime occurs. However, existing monitoring systems typically identify failures only after or immediately before downtime begins.

Further, existing solutions for monitoring machine failures typically rely on a set of predetermined rules for each machine. These rules sets do not account for all data that may be collected with respect to the machine, and may only be used for checking particular key parameters while ignoring the rest. Moreover, these rule sets must be provided in advance by engineers or other human analysts. As a result, only some of the collected data may be actually used by existing solutions, thereby resulting in wasted use of computing resources related to transmission, storage, and processing of unused data. Further, failure to consider all relevant data may result in missed or otherwise inaccurate determination or prediction of failures.

Additionally, existing solutions often rely on periodic testing at predetermined intervals. Thus, even existing solutions that can predict failures in advance typically return requests to perform machine maintenance even when the machine is not in immediate condition of failure. Such premature replacement and maintenance results in wasted materials and expenses spent replacing parts that are still functioning properly. Further, such existing solutions often determine failures only after failure occurs. As a result, such failures may not be prevented, resulting in down time and lost revenue.

Furthermore, existing monitoring and maintenance solutions often require dedicated testing equipment. Consequently, these solutions typically require specialized operators who are well-trained in the operation of each monitoring and maintenance system. Requiring specialized operators can be inconvenient and costly, and may introduce potential sources of human error. Additionally, given the sheer amount of data that may be collected for any given machine in addition to minute fluctuations in data, a human analyst is not capable of adequately determining upcoming failures.

Moreover, existing solutions often rely on raw physical data that may not be indicative enough for enabling prediction of machine failures. As a result, such failures may not be prevented, resulting in down time and lost revenue.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for forecasting failures in industrial machines, including: receiving raw sensory inputs collected from at least one machine; generating a plurality of data features based on the raw sensory inputs; selecting from the plurality of data features a plurality of indicative data features, wherein the selection is based on a distribution of the plurality of indicative data features that determines an association between the plurality of indicative data features and a machine failure; selecting, based on the plurality of indicative data features, a machine learning model; applying the selected machine learning model to the plurality of indicative data features; and determining a probability for a forthcoming machine failure.

Certain embodiments disclosed herein also include on-transitory computer readable medium having stored thereon instructions for causing a processing circuitry to perform a process, the process including: receiving raw sensory inputs collected from at least one machine; generating a plurality of data features based on the raw sensory inputs; selecting from the plurality of data features a plurality of indicative data features, wherein the selection is based on a distribution of the plurality of indicative data features that determines an association between the plurality of indicative data features and a machine failure; selecting, based on the plurality of indicative data features, a machine learning model; applying the selected machine learning model to the plurality of indicative data features; and determining a probability for a forthcoming machine failure.

Certain embodiments disclosed herein also include a system for forecasting failures in industrial machines, including: a processing circuitry; and a memory, the memory containing instructions that, when executed by the processing circuitry, configure the system to: receiving raw sensory inputs collected from at least one machine; generate a plurality of data features based on the raw sensory inputs; select from the plurality of data features a plurality of indicative data features, wherein the selection is based on a distribution of the plurality of indicative data features that determines an association between the plurality of indicative data features and a machine failure; select, based on the plurality of indicative data features, a machine learning model; apply the selected machine learning model to the plurality of indicative data features; and determine a probability for a forthcoming machine failure.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
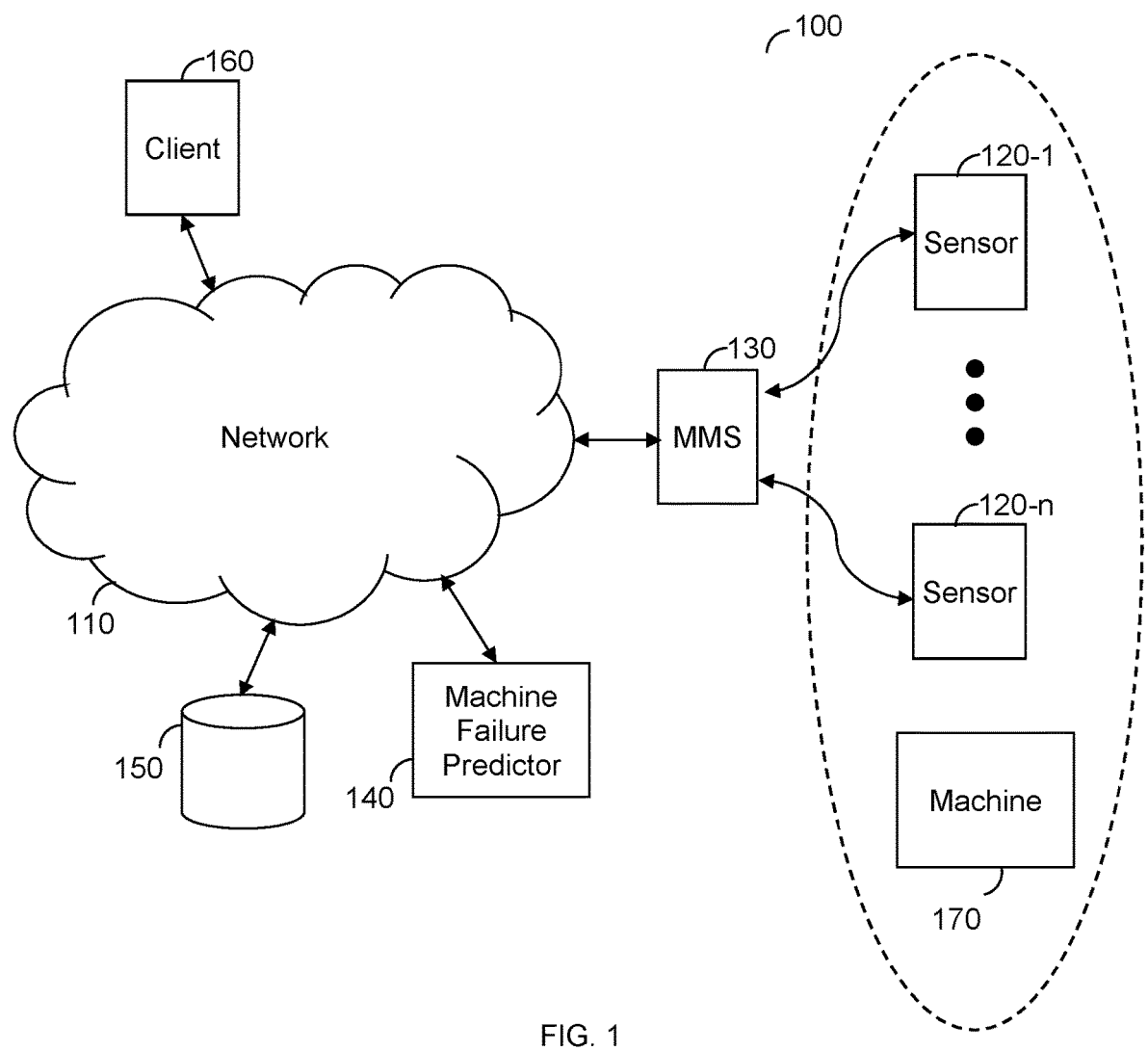
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

After receiving raw sensory inputs related to a machine, the raw sensory inputs are automatically preprocessed and transformed into a plurality of data features using a mathematical function. One or more indicative data features are then selected, from the plurality of data features, based on a distribution of the plurality of indicative data features that demonstrate at least an association between the plurality of indicative data features and a machine failure. Based on the indicative data features, a preferred machine learning model is autonomously selected. The preferred machine learning model includes an accurate machine failure prediction capabilities and better long-range predictability of a machine failure with respect to the plurality of machine learning models. The selected machine learning model is applied to the plurality of indicative data features for at least determining the probability for a forthcoming machine failure.

FIG. 1 shows an example network diagram 100 utilized to describe the various disclosed embodiments. The example network diagram 100 includes a machine monitoring system (MMS) 130, a machine failure predictor 140, a database 150, and a client device 160 connected through a network 110. The example network diagram 100 further shows a plurality of sensors 120-1 through 120-n (hereinafter referred to individually as a sensor 120 and collectively as sensors 120, merely for simplicity purposes, where n is an integer equal to or greater than 1), communicatively connected to the machine monitoring system 130. The network 110 may be, but is not limited to, a wireless network, a cellular or wired network, a local area network (LAN), a wide area network (WAN), a metro area network (MAN), the Internet, the worldwide web (WWW), similar networks, and any combination thereof.

The client device 160 may be, but is not limited to, a personal computer, a laptop, a tablet computer, a smartphone, a wearable computing device, or any other device capable of receiving and displaying notifications indicating maintenance and failure timing predictions, results of supervised analysis, unsupervised analysis of machine operation data, and the like.

The sensors 120 are located in proximity (e.g., physical proximity) to a machine 170. The machine 170 may be any machine for which performance can be represented via sensory data including industrial machine used in industrial settings, such as, but not limited to, a turbine, an engine, a welding machine, a three-dimensional (3D) printer, an injection molding machine, a combination thereof, a portion thereof, and the like. Each sensor 120 is configured to collect sensory inputs such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be, but is not necessarily, communicatively or otherwise connected to the machine 170 (such a connection is not illustrated in FIG. 1 merely for the sake of simplicity and without limitation on the disclosed embodiments).

The sensors 120 are connected or coupled to the machine monitoring system 130. The machine monitoring system 130 may be configured to store and to preprocess raw sensory inputs received from the sensors 120. Alternatively or collectively, the machine monitoring system 130 may be configured to periodically retrieve collected sensory inputs stored in, for example, the database 150. The preprocessing may include, but is not limited to, data cleansing, normalization, rescaling, re-trending, reformatting, noise filtering, a combination thereof, and the like.

The preprocessing may further include data feature extraction. The results of the data feature extraction may include data features to be utilized by the machine failure predictor 140 during machine learning in order to detect data features that indicate on forthcoming machine failure as further described herein below. The data feature extraction may include, but is not limited to, dimension reduction techniques such as, but not limited to, singular value decompositions, discrete Fourier transformations, discrete wavelet transformations, line segment methods, or a combination thereof. When such dimension reduction techniques are utilized, the preprocessing may result in a lower-dimensional space for the sensory inputs. The machine monitoring system 130 is configured to send the preprocessed sensory inputs to the machine failure predictor 140.

In an embodiment, the machine failure predictor 140 is configured to receive, via the network 110, raw sensory inputs associated with the machine 170 from the machine monitoring system 130. The raw sensory inputs may be received constantly in real-time, or may be stored locally and sent to the machine failure predictor 140 in batches. Each type of the raw sensory inputs may be related to at least a process that is associated with the machine, executed by the machine, and so on. That is, a first type of sensory inputs may be related to the temperature of the machine 170, a second type of sensory inputs may be related to the speed of a certain gear of the machine 170, and so on. In a further embodiment, the machine failure predictor 140 is configured to receive preprocessed sensory inputs.

In an embodiment, the machine failure predictor 140 may further store the sensory input (raw, preprocessed, or both) data received from the machine monitoring system 130. Alternatively or collectively, the sensory input data may be stored in the database 150. The database 150 may further store sensory inputs (raw, preprocessed, or both) collected from a plurality of other sensors (not shown) associated with other machines (also not shown). The database 150 may further store indicators, anomalous patterns, behavioral trends, failure predictions, machine learning models utilized for analyzing sensory input data, or a combination thereof.

In an embodiment, the machine failure predictor 140 is configured to preprocess the raw sensory inputs as further described herein above. In a further embodiment, the machine failure predictor 140 is configured to generate one or more data features based on the sensory inputs. The data features may be represented by mathematically calculated features. In a further embodiment, the generation may be executed by transforming the preprocessed sensory inputs and/or each type of the raw sensory inputs into one or more data features that are represented by a mathematically calculated feature. The data features may be a mathematic representation of the raw sensory inputs configured to represent the sensory inputs in a clear manner. The generation may be achieved using at least one statistical analysis technique. Statistical analysis techniques may include, but are not limited to, calculating mean for the raw sensory inputs, calculating median for the raw sensory inputs, calculating standard deviation for the raw sensory input, and so on. In an embodiment, implementing one or more of the statistical analysis techniques on the raw sensory inputs allows the machine failure predictor 140 to generate the plurality of data features.

The data features allow for the identification of an association between a plurality of anomalies associated with a plurality of processes related to the machine 170. That is, the data features are new and informative representation of the raw, or preprocessed sensory inputs, allowing to identify hidden structures in the raw sensory inputs. In a further embodiment, the transformation includes reducing the size of the raw sensory inputs, for example, by transforming raw data in seconds resolution into indicative minutes resolution. In a further embodiment, the transformation includes normalizing the raw sensory inputs and/or preprocessed sensory inputs to a uniform scale. That is, the raw sensory inputs may be in different scales and therefore the machine failure predictor 140 may be configured to normalize the raw sensory inputs by generating a uniform scale for all raw sensory inputs. The uniform scale may be utilized to identify an association between the different types of sensory inputs, a correlation between abnormal behaviors of the different types of sensory inputs, and the like.

In an embodiment, the machine failure predictor 140 is configured to select from the plurality of data features a plurality of indicative data features. Indicative data features are representation of the raw sensory inputs, that when analyzed, allowing to better indicate on a forthcoming machine failure with respect to other different data features having a weaker capability to contribute to a machine failure prediction. In a further embodiment, the plurality of indicative data features is selected based on at least a distribution of the plurality of indicative data features. The distribution may indicate a developing association between the plurality of indicative data features towards a machine failure.

In an example, a machine (e.g., the machine 170) having five components is being monitored, and during a certain period of time the parameters of three indicative data features associated with three components of the machine 170 indicate abnormal parameters of each of the components. Indicative data feature may include, for example, operating temperature of a machine, current and recent energy consumption, speed of a mechanical component, and the like. Abnormal parameters include values of these features exceeding or falling below predetermined thresholds, e.g., the main gear of a machine rotating above 2,500 RPM. According to the same example, the machine failure predictor 140 may determine that the distribution of the indicative data features, i.e., the abnormal parameters of each of them, indicate an association between the three indicative data features that may be indicative of a forthcoming machine failure. For example, it may be predetermined that the indicative data features of an operating temperature of a gear axle, a rotational speed of a main gear mounted onto the axle, and a voltage applied to the axle may be associated with each other. When two out of the three are exceed a predetermined threshold, the triggering threshold of the third may be lowered to indicate a potential upcoming failure within the machine. In a further embodiment, the selection of the indicative data features having a better probability to contribute more to predicting a machine failure with respect to other data features may be achieved by identifying an increasing change in the data feature distribution prior to a machine failure compared to a normal state of the machine. In a further embodiment, the selection of the plurality of indicative sensory inputs is executed upon identification of a new machine failure. In a further embodiment, at least a portion of the plurality of indicative data features is used as an input to a machine learning model as further described herein below.

It should be noted that different machines operate in different ways and have different components. Therefore, a first set of indicative data features determined to contribute the most to a prediction of a forthcoming machine failure of a first machine may be different from a second set of indicative data features determined to contribute the most for a prediction of a forthcoming machine failure of a second machine.

In an embodiment, the machine failure predictor 140 is configured to select, based on at least one indicative data feature of the plurality of indicative data features, a preferred machine learning model from a plurality of machine learning models. The preferred machine learning model includes more accurate machine failure prediction capabilities and better long-range predictability of a machine failure with respect to the plurality of machine learning models. The preferred machine learning model is selected based on the probability to optimally predict a machine failure considering the indicative selected data features. Optimal prediction of a machine failure may include two main parameters, such as a highest accurate level of machine failure prediction, without any false positives, and a long-range predictability of a machine failure.

In a further embodiment, the machine failure predictor 140 is configured to select the preferred machine learning model from a plurality of machine learning models regardless of the plurality of indicative data features. That is, the preferred machine learning model may be selected with respect to the prediction capabilities of the plurality of machine learning models as previously tested, validated and determined. In a further embodiment, a set of hyperparameters that is optimal for use with the selected machine learning model is selected. The selection of the hyperparameters allows to optimize an accuracy level of the machine learning model. A hyperparameter is an external parameter used to determine which machine learning model to employ, and may be selected manually by a user. They may include parameters from a prior model similar to the currently employed model, such as the depth of a decision tree or how many layer the machine learning model should employ.

In an embodiment, the machine failure predictor 140 is configured to apply the selected machine learning model on the plurality of indicative data features. By applying the selected machine learning model, the machine failure predictor 140 may be configured to perform real-time, or near real-time, classification of a machine health state. The classification may include, but is not limited to, three machine health states, such as, normal, trend indicating on a forthcoming machine failure and failure. The normal health state is represented by normal values, i.e., parameters of the indicative data features. The normal values may be previously determined based on indicators allowing to detect anomalies related to a certain sensory input, e.g., a data feature. A trend health state is represented by increasing changes associated with at least a portion of the plurality of indicative data features that may indicate on abnormal values of the indicative data features.

As further discussed herein above, the changes may be represented by the distribution of the plurality of indicative data features. The trend health state may be determined based on the indicators allowing to detect anomalies related to a certain sensory input, i.e. data feature. The indicators may be utilized to determine, with respect to each type of sensory input, indicative data features, whether at least a portion of the indicative data features represents a normal or abnormal behavior of at least a single component of the machine 170. That is, an indicator may be, for example, a data point that is positioned above a maximum threshold or below a minimum threshold, such that, upon determination that one of the thresholds has been exceeded, an anomaly may be detected.

The indicators allow identification of a correlation between abnormal behaviors of a plurality of indicative data features. The identification of the correlation may be achieved by monitoring a plurality of components of a machine (e.g., the machine 170), where the correlation may be represented by meta-models. The meta-models are models that are generated from one or more machine learning models and take into account prior data. They are based on the indicative sensory inputs related to their respective components, and may be utilized to identify anomalies in the operation of each respective component of the machine. In an embodiment, the trend health state may be divided into different levels, e.g. one week before failure, two weeks before failure, and so on. Thus, a meta-model may include data representing the correlation between certain component failures of a machine, e.g., as detected by abnormal behavior of indicative data features, and the time period between such a detection and an actual failure.

The failure state may be represented by, for example, radical values of all of the indicative data features. In a further embodiment, the machine failure predictor 140 may be configured to generate, based on the generated data features of the indicative sensory inputs, a health graph that summarizes the machine health state.

It should be noted that different parameters represented by the indicative data features may be analyzed using different machine learning models. For example, a temperature parameter may be analyzed by applying a first machine learning model to indicative data features related to a temperature sensor, and an energy consumption parameter may be analyzed by applying a second machine learning model to indicative data feature related to an energy consumption gage. In an embodiment, the machine learning model includes various machine learning techniques, e.g., deep learning, neural networks, such as deep convolutional neural network, recurrent neural networks, decision tree learning, Bayesian networks, clustering, and the like.

In an embodiment, the machine failure predictor 140 is configured to determine at least a probability for a forthcoming machine failure, i.e., likelihood for a machine failure to occur. The determination of the probability may be performed constantly. In a further embodiment, the machine failure predictor 140 may be configured to determine at least one trend that is indicative of at least one forthcoming machine failure. In a further embodiment, the determination of the trends may be achieved by identifying a predetermined number of machine components parameters represented by indicative data features and exceeding a certain threshold that is indicative of an abnormal behavior of the machine component over a predefined period of time.

As an example, when a machine (e.g., the machine 170) including ten components is being monitored, and during a certain period of time the sensors of three components of the machine 170 indicate on abnormal behavior, the machine failure predictor 140 may identify a correlation between the three indicative data features. The machine failure predictor 140 may be configured to identify a trend across, for example, a predetermined number of indicative data features, and therefore determine that a machine failure is about to happen. In a further embodiment, the machine failure predictor 140 is configured to tag the correlation between the indicative data features. Such tagging may allow the system to store and retrieve data for further use related to the identified correlation.

In a further embodiment, the machine failure predictor 140 is configured to generate a meta-model based on at least data collected from one portion of the machine 170. Each portion of the machine for which a meta-model is generated may be a component (not shown) such as, but not limited to, a pipe, an engine, a portion of an engine, a combination thereof, and the like. Generating a meta-model may include, but is not limited to, selecting one or more models that optimally indicates anomalies in the sensory inputs for each of the at least one portion of the machine 170. The models may be external models retrieved from a database, or prior internal models generated from data produced from the various components and indicative data features of the current machine. Each of the generated meta-models is utilized to detect anomalies in the behavior of the respective portion of the machine 170.

In an embodiment, the machine failure predictor 140 is configured to generate, in real-time, at least one adaptive threshold for detecting anomalies based on the analysis of the indicative data features. In a further embodiment, the machine failure predictor 140 is configured to determine, in real-time, normal behavior patterns for the data features, i.e., the sensory inputs of the machine 170 or each portion thereof. The adaptive thresholds may be generated based on the determined normal behavior patterns.

In an embodiment, based on the detected anomalies, suspected errors may be determined. In a further embodiment, when a suspected error is determined, the machine failure predictor 140 may be configured to generate a notification indicating anomalous activity and/or trends that may lead to a machine failure. In a further embodiment, the machine failure predictor 140 is further configured to send the generated notification to a client device 160. Alternatively, or collectively, the machine failure predictor 140 may be configured to send the notification to a system (not shown) configured to automatically mitigate failures. In a further embodiment, the notification may include at least a suggestion allowing to overcome the forthcoming machine failure by performing one or more operative actions.

It should be noted that the machine monitoring system 130 is shown in FIG. 1 as a separate component from the machine failure predictor 140 merely for simplicity purposes and without limitation on the disclosed embodiments. The machine monitoring system 130 may be incorporated in the machine failure predictor 140 so as to allow the machine failure predictor 140 to obtain and preprocess sensory inputs without departing from the scope of the disclosure.

It should also be noted that the embodiments described herein above with respect to FIG. 1 are discussed with respect to a client device 160 and a machine 170 merely for simplicity purposes and without limitation to the disclosed embodiments. Multiple client devices may receive information related to machine maintenance, trends and failures without departing from the scope of the disclosure. Additionally, sensory inputs related to multiple machines may be collected to determine failures of any or all of the machines without departing from the scope of the disclosure.

It should be further noted that the embodiments disclosed herein are not limited to the specific architecture illustrated in FIG. 1 and other architectures may be equally used without departing from the scope of the disclosed embodiments. Specifically, the machine failure predictor 140 may reside in a cloud computing platform, a datacenter, on premise, a hybrid combination thereof, and the like. Moreover, in an embodiment, there may be a plurality of management servers operating as described hereinabove and configured to either have one as a standby proxy to take control in a case of failure, to share the load between them, or to split the functions between them.

Figure 2:
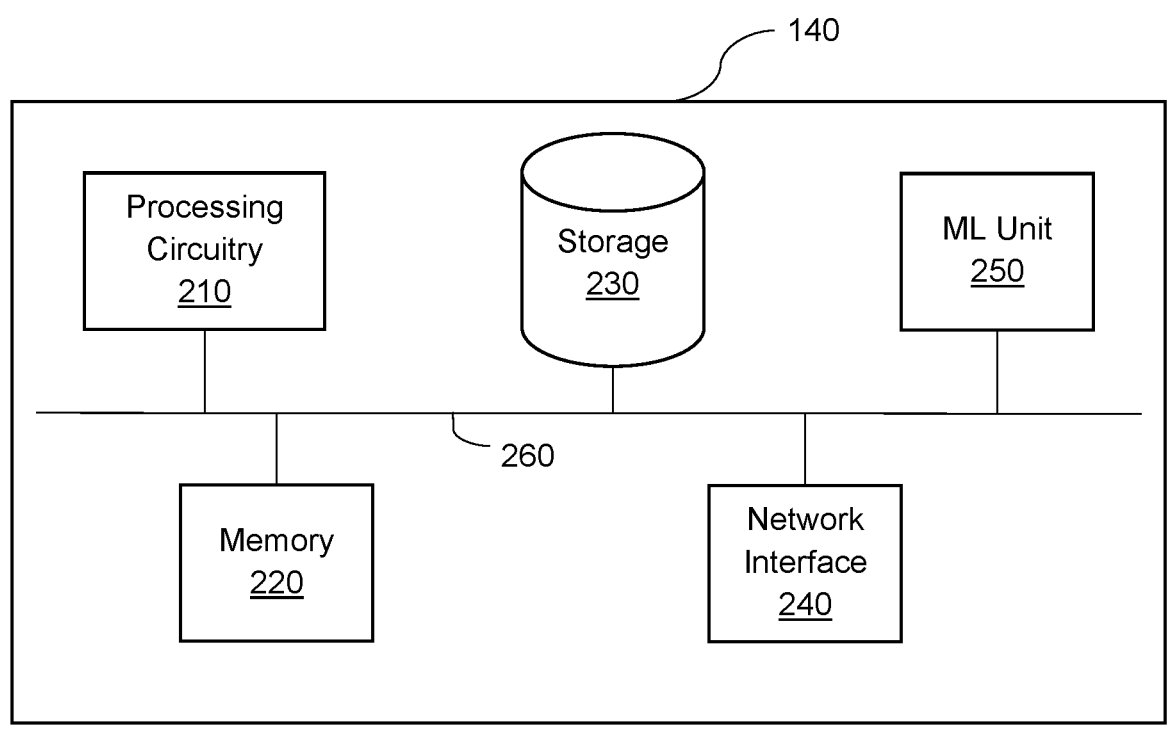
FIG. 2 is a schematic diagram of a machine failure predictor system according to an embodiment.

FIG. 2 shows an example block diagram of the machine failure predictor 140 implemented according to one embodiment. The machine failure predictor 140 includes a processing circuitry 210 coupled to a memory 220, a storage 230, a network interface 240, and a machine learning (ML) processor 250. In an embodiment, the components of the machine failure predictor 140 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the machine failure predictor 140 to communicate with the machine monitoring system 130, e.g., via a network 110, for the purpose of, for example, receiving raw and/or preprocessed sensory inputs. Additionally, the network interface 240 allows the machine failure predictor 140 to communicate with the client device 160 in order to send, e.g., notifications related to anomalous activity, machine failure prediction, etc.

The machine learning processor 250 is configured to perform machine learning algorithms based on sensory inputs received via the network interface 240 as described further herein. In an embodiment, the machine learning processor 250 is further configured to determine, based on one or more machine learning models, predictions for failures of the machine 170. In a further embodiment, the machine learning processor 250 is also configured to determine at least one recommendation for avoiding or mitigating the determined predicted failures. As a non-limiting example, the at least one recommendation may indicate that an exhaust pipe on the machine 170 should be replaced in the near future with a new exhaust pipe to avoid failure. The processor 250 may be a GPU, a TPU, a DSP, or any similar processor capable of running machine learning processes.

It should be understood that the embodiments described herein are not limited to the specific architecture illustrated in FIG. 2, and other architectures may be equally used without departing from the scope of the disclosed embodiments.

Figure 3A:
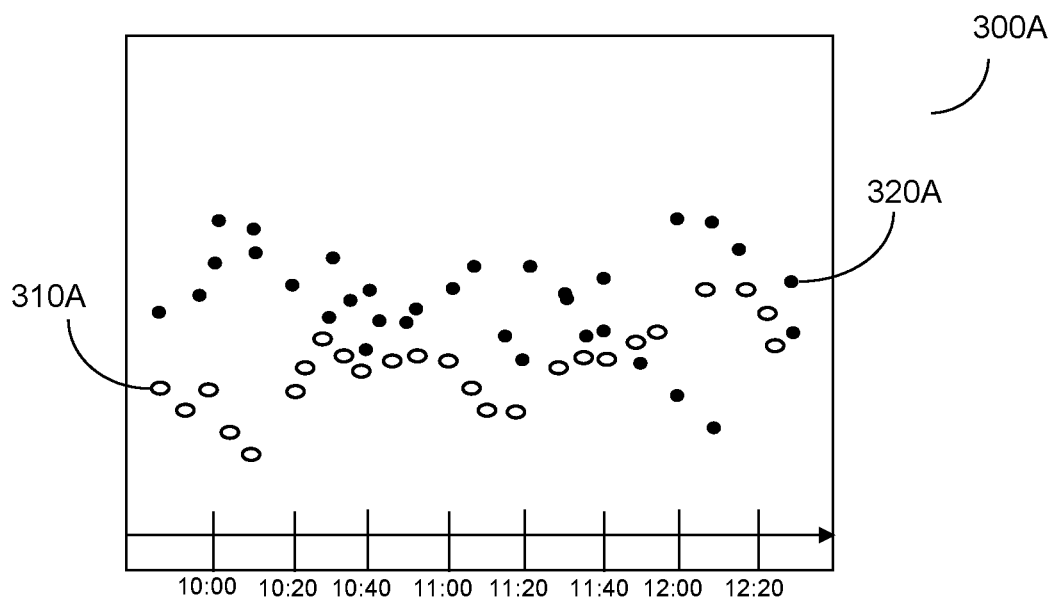
FIG. 3A simulates representation of raw sensory inputs according to an embodiment.

FIG. 3A is an example simulation illustrating representation of raw sensory inputs according to an embodiment. The simulation shown in FIG. 3A includes a graph 300A in which two raw sensory inputs are represented by a first type of points 310A and by a second type of points 320A. In the example simulation shown in FIG. 3, the points 310A represent raw sensory inputs that are related to, for example, a first process and or parameter that is associated with the machine. For example, the points 310A may describe the temperature of a machine (e.g., the machine 170, FIG. 1) over time. The points 320A represent raw sensory inputs that are related to, for example, a second process and or parameter that is associated with the machine. For example, the points 320A may describe the energy consumption of a machine (e.g., the machine 170, FIG. 1) over time. As further described herein above, the representation of the raw data is not indicative and therefore identification of a correlation between the example two parameters may be difficult to achieved.

Figure 3B:
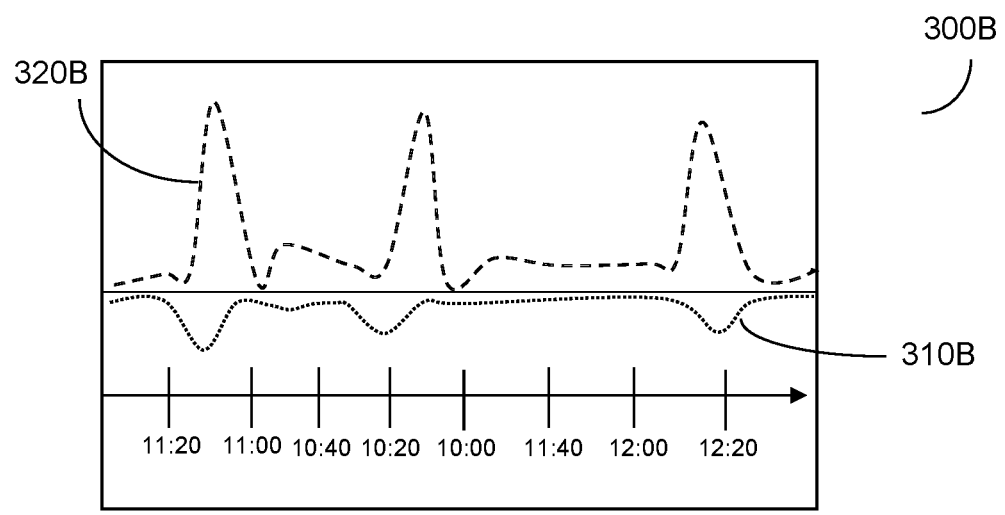
FIG. 3B simulates representation of indicative sensory inputs according to an embodiment.

FIG. 3B is an example simulation 300B illustrating representation of indicative sensory inputs according to an embodiment. The simulation shown in FIG. 3B includes a graph 300B in which two raw sensory inputs are represented by a first curve 310B and by a second curve 320B. In the example simulation shown in FIG. 3B, the curve 310B represents indicative sensory inputs that is related to, for example, a first process and or parameter that is associated with the machine. For example, the curve 310B may be an indicative representation of the temperature of a machine (e.g., the machine 170, FIG. 1) over time. The indicative representation may be achieved by implementing one or more statistical analysis technique on the initial raw sensory inputs received from one or more sensors, for transmitting the raw sensory inputs into indicative sensory inputs. The curve 320B represents indicative sensory inputs that is related to, for example, a second process and or parameter that is associated with a machine (e.g., the machine 170, FIG. 1). For example, the curve 320B may describe the energy consumption of a machine (e.g., the machine 170, FIG. 1) over time.

The representation of the indicative sensory inputs allows to facilitate the identification of a correlation between the example two parameters and therefore allows to identify trends having influence on the machine behavior, and to predict machine failures in time. In the simulation shown in FIG. 3B, the correlation between the parameters, i.e., the indicative sensory inputs, may be that when the temperature, represented by the curve 310B, is below a certain threshold (not shown) the energy consumption, represented by the curve 320B, exceeds a certain threshold (not shown). As an example, the correlation between the temperature and the energy consumption may indicate that when the temperature drops below a certain threshold and the energy consumption rises above a certain threshold, a machine failure is likely to occur within one week.

Figure 4:
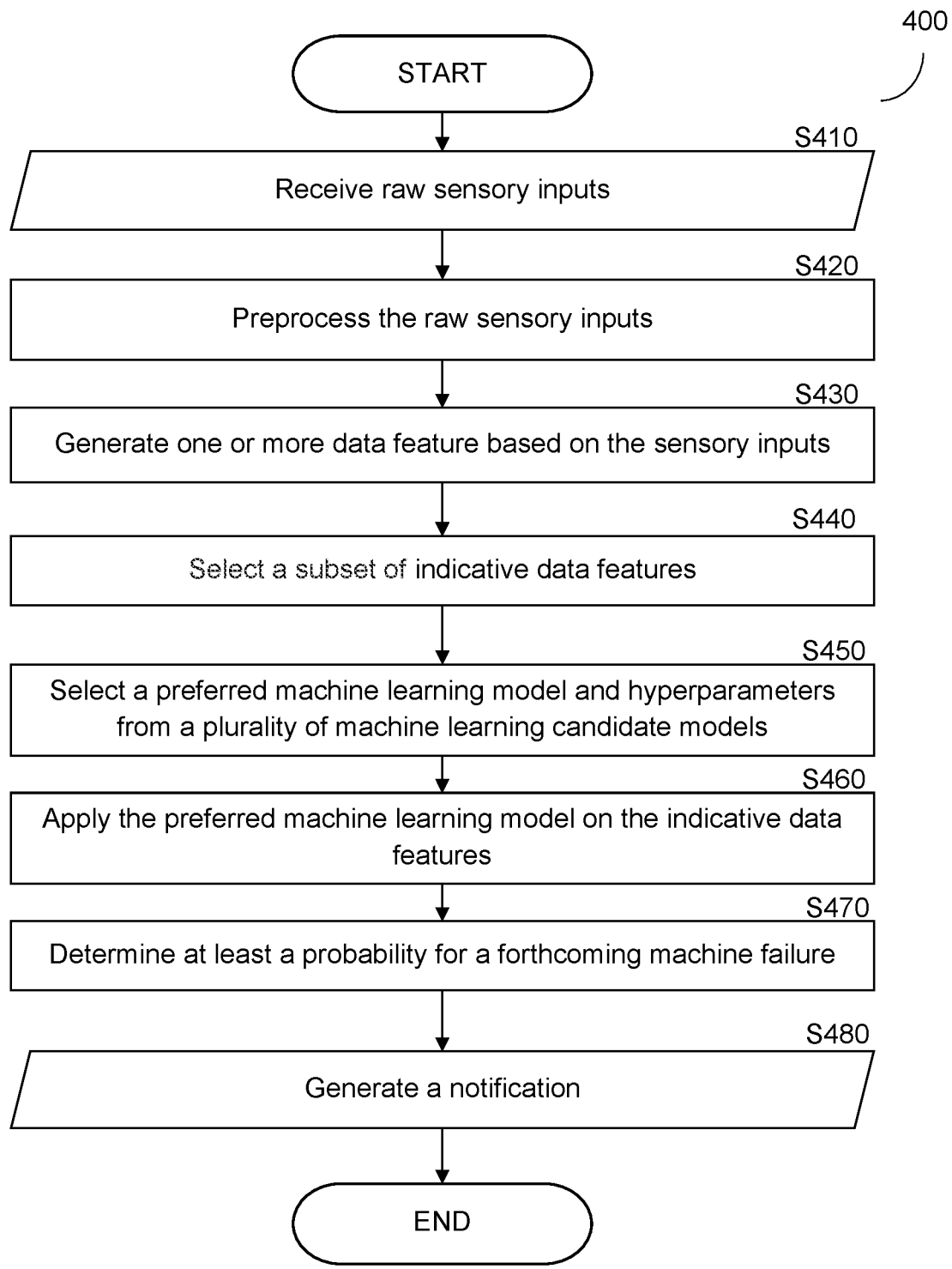
FIG. 4 is a flowchart illustrating a method for forecasting forthcoming machine failures according to an embodiment.

FIG. 4 is an example flowchart 400 illustrating a method for forecasting machine failures according to an embodiment. In an embodiment, the method may be performed by the machine failure predictor 140.

At S410, raw sensory inputs related to a machine (e.g., the machine 170) are received. Each type of the raw sensory inputs may be related to, for example, a process that is associated with the machine as further described herein above.

At S420, the raw sensory inputs are preprocessed. The preprocessing of such inputs may include, but is not limited to, data cleansing, normalization, rescaling, re-trending, reformatting, noise filtering, a combination thereof, and the like. For example, the raw data from multiple sources may be normalized to a uniform scale, such as shifting all input data to number of anomalies detected per minute. This allows for an easy comparison of the various raw sensory input for proper analyses. In an embodiment, S420 is optional.

At S430, one or more data features are generated based on the sensory inputs which may be preprocessed. The data features may be represented by mathematically calculated features. In an embodiment, S430 may include transforming the preprocessed sensory inputs and/or each type of the raw sensory inputs into one or more data features that are represented by mathematically calculated feature. Data features may include relevant values from machine components, such as revolution per minute or operating temperature of specific components used for turning a gear or executing computer functions, respectively. Transforming the raw sensory inputs into data features may be achieved using at least one statistical analysis technique as further described herein above. Statistical analysis technique may include, but is not limited to, calculating mean for the raw sensory inputs, calculating median for the raw sensory inputs, calculating standard deviation for the raw sensory input, and so one.

At S440, one or more indicative data features is selected from the plurality of data features. The plurality of indicative data features may be, for example, a subset of the plurality of data features. Indicative data features are component values extracted from the raw sensory inputs of machine components, that when analyzed, are representative of the health of the machine, and may be indicative of a forthcoming machine failure. In a further embodiment, the plurality of indicative data features is selected based on at least a distribution of the plurality of indicative data features. The distribution may indicate on a developing association between the plurality of indicative data features towards a machine failure.

At S450, at least a preferred machine learning model is selected from a plurality of machine learning models. The selection of the preferred machine learning model may be achieved based on the indicative data features. The preferred machine learning model includes more accurate machine failure prediction capabilities and better long-range predictability of a machine failure with respect to the plurality of machine learning models. The preferred machine learning model is selected based on the probability to optimally predict a machine failure considering the selected indicative data features. In an embodiment, a meta-model generated from one or more machine learning models taking into account prior data is used to determine the preferred machine learning model for the specific machine used.

In a further embodiment, S450 further includes selecting a set of hyperparameters that is optimal for use with the selected machine learning model. The selection of the hyperparameters allows to optimize an accuracy level of the machine learning model. In a further embodiment, the machine failure predictor 140 is configured to select the preferred machine learning model from a plurality of machine learning models regardless of the plurality of indicative data features.

At S460, the preferred machine learning model is applied on the selected indicative data features. This is performed to determine at least a probability for a forthcoming machine failure, identifying a trend that is indicative of a forthcoming machine failure, and so on.

At S470, a probability for a forthcoming machine failure with respect to every point in time of the machine operation is constantly determined. In a further embodiment, S470 further includes identification of at least one trend indicating on at least one forthcoming machine failure. The identifying the trend may be achieved based on identification of a correlation between abnormal parameters associated with the plurality of indicative data features.

At optional S480, a notification is generated. The notification may indicate, e.g., the probability for a forthcoming machine failure, a trend, and/or a machine failure prediction. The notification may be sent to a client device or may be sent to a system configured to automatically perform maintenance on the machine or a portion thereof.

Figure 5A:
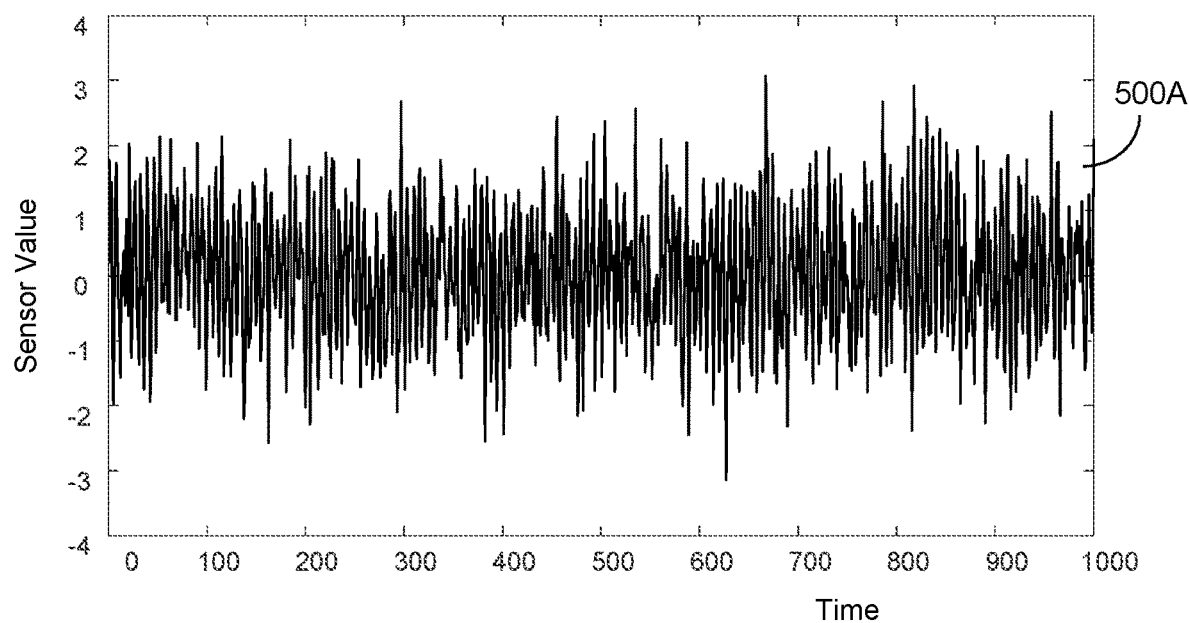
FIG. 5A simulates representation of the raw sensory inputs according to an embodiment.
Figure 5B:
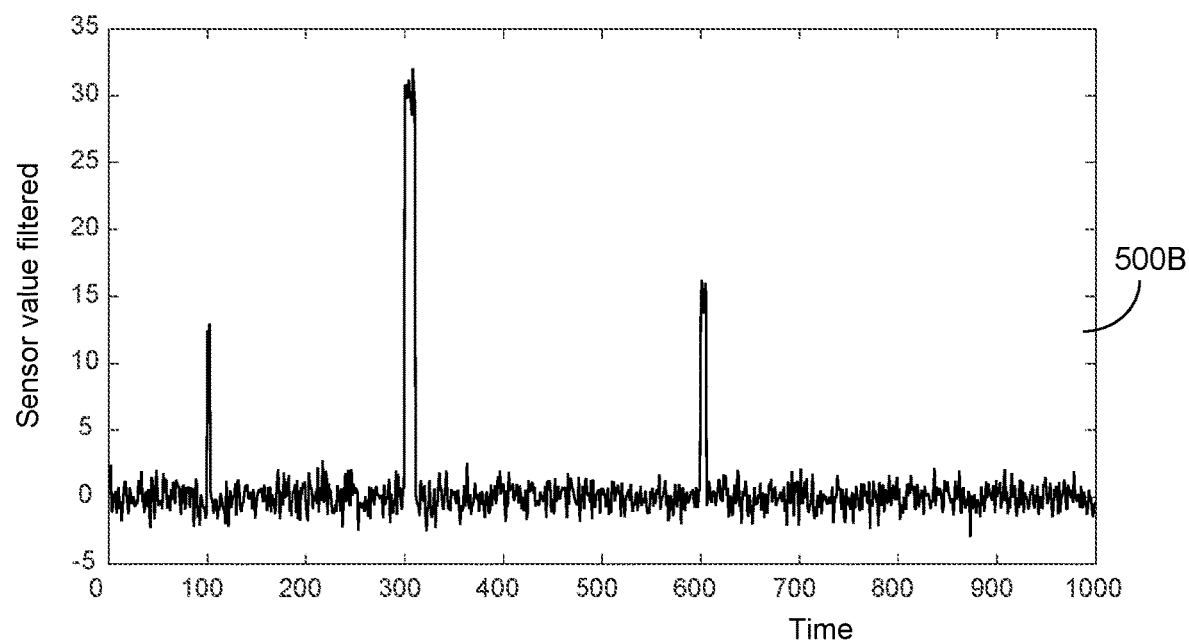
FIG. 5B simulates representation of a filtered version of raw sensory inputs according to an embodiment.

FIG. 5A is an example simulation 500A illustrating representation of raw sensory inputs in which abnormal values may be difficult to detect. FIG. 5B is an example simulation 500B illustrating representation of a filtered version of the raw sensory inputs of FIG. 5A. The filtered sensory inputs may be for example, preprocessed sensory inputs.

Figure 6A:
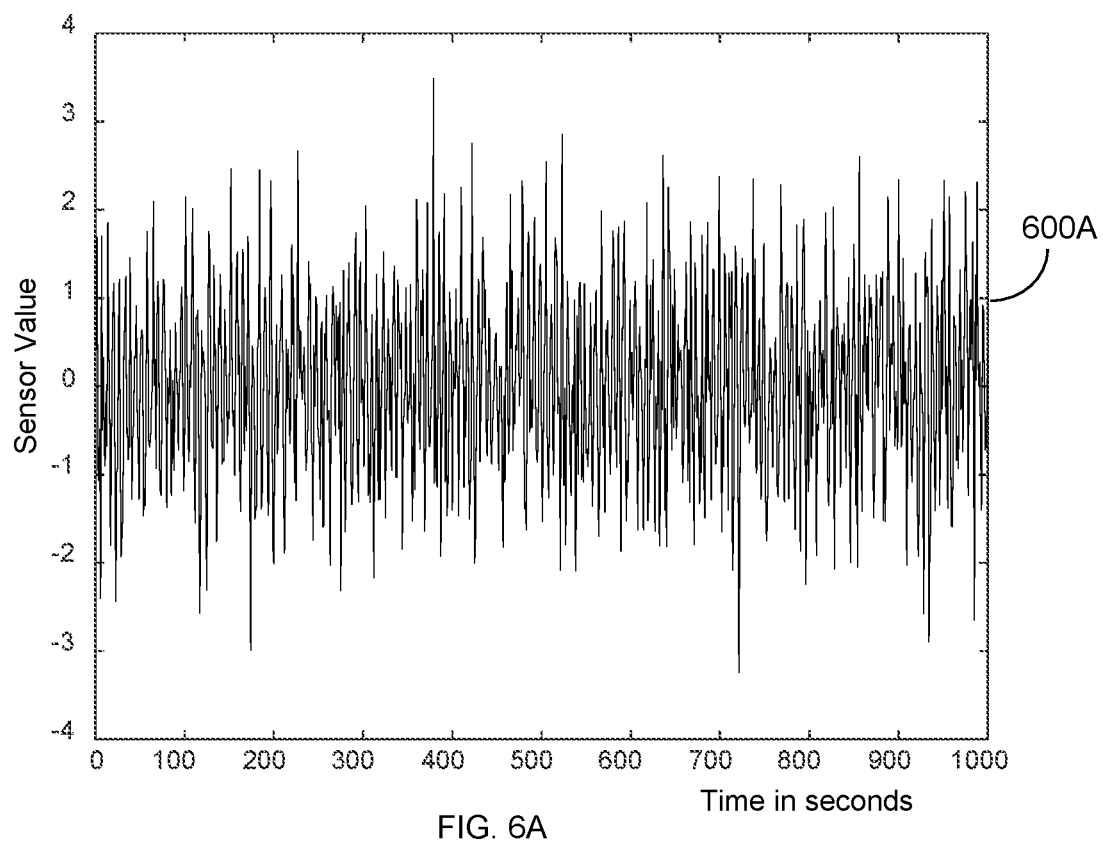
FIG. 6A simulates representation of raw sensory inputs in seconds according to an embodiment.
Figure 6B:
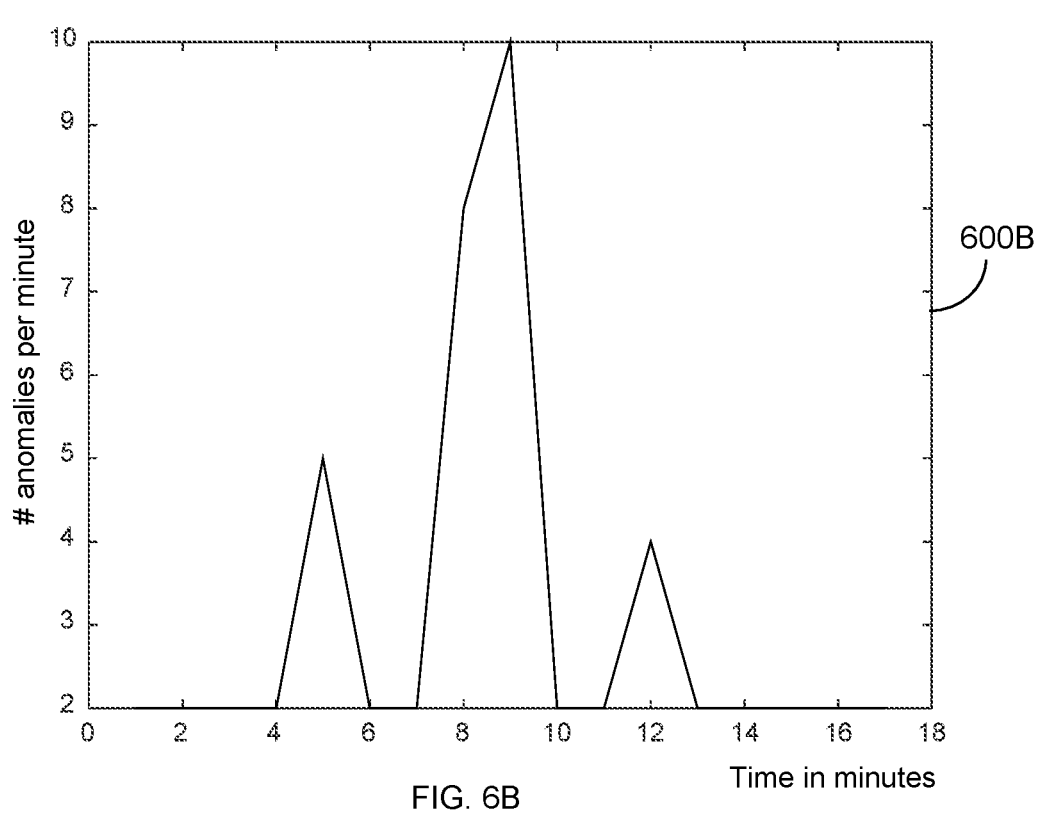
FIG. 6B simulates representation of anomalies identified in a minute resolution that is based on the raw sensory inputs of FIG. 6A according to an embodiment.

FIG. 6A is an example simulation 600A illustrating representation of raw sensory inputs in seconds resolution for demonstrating the difficulty to detect anomalies and trends indicating on forthcoming machine failures in such resolution. The raw data shown in simulation 600A is noisy and the scale used, e.g., direct sensor value and time in second, makes it difficult to easily discern relevant event. FIG. 6B, on the other hand, is an example simulation 600B illustrating representation of a data feature generated based on the sensory input shown in FIG. 6A highlighting significant events. The anomalies identified in a minute resolution is based on the raw sensory inputs of FIG. 6A, and significant events, such as a spike in anomalies per minute, can clearly be seen around the 5, 8 and 12 minute marks.

Figure 7A:
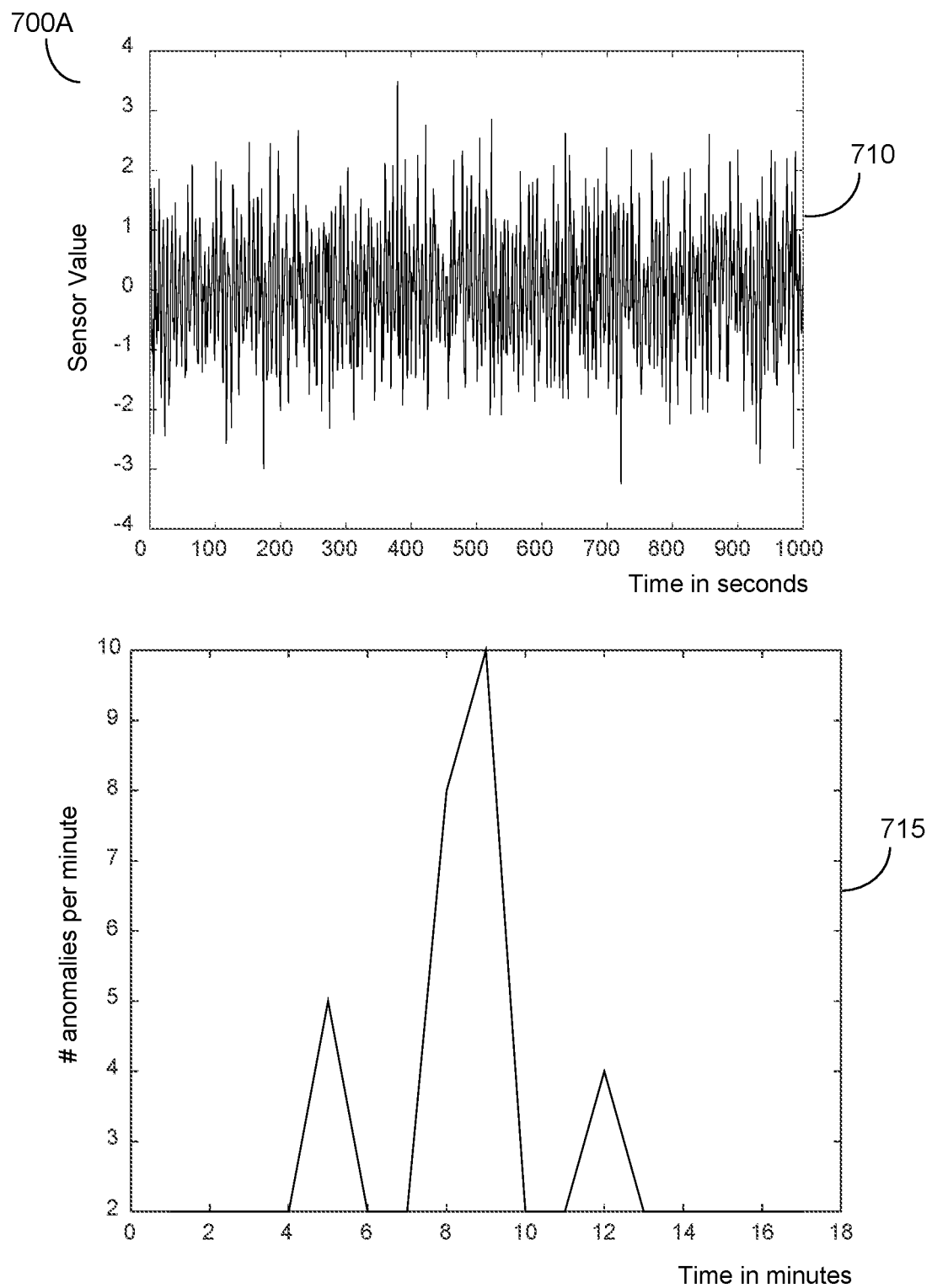
FIG. 7A illustrates normalization of raw sensory inputs to a uniform scale according to an embodiment.
Figure 7B:
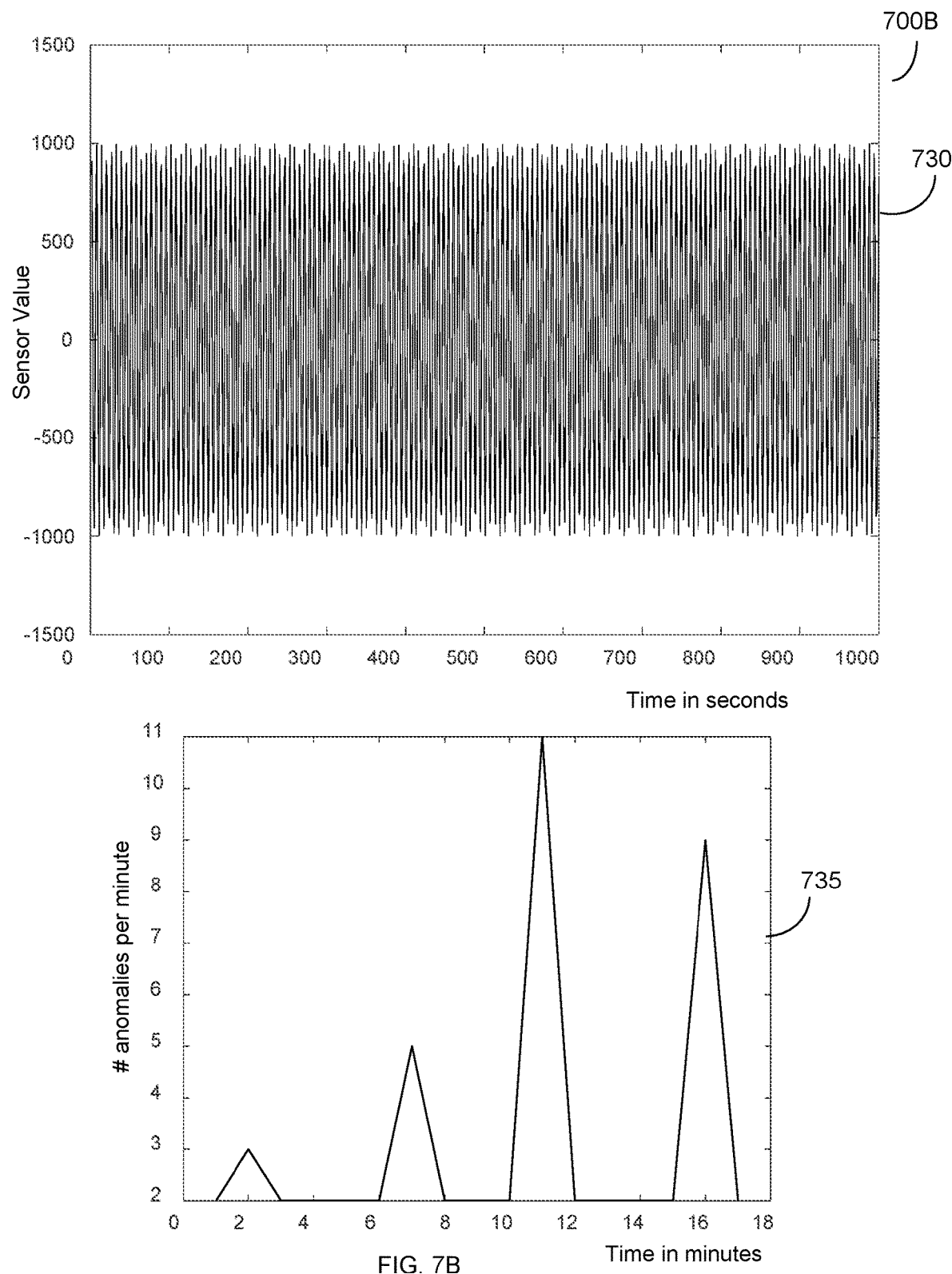
FIG. 7B illustrates normalization of raw sensory inputs to a uniform scale according to an embodiment.

FIG. 7A and FIG. 7B are examples simulation 700A and 700B illustrating normalization of raw sensory inputs to a uniform scale. After the raw sensory inputs 710 and 730 are received, the pre-processing method described herein above is performed and thus the machine failure predictor (shown in FIGS. 1 and 2) is able to generate a uniform scale, such as the scale presented at the graphs 715 and 735. The uniform scale may be a representation of the data features of the sensory inputs. The uniform scale may be utilized to identify the distribution of a subset of indicative data features determined to allow better predictability compared to other data features. When the distribution of a plurality of indicative data features changes in a certain manner it may indicate on a forthcoming machine failure. For example, when a first set of parameters of a first indicative data feature increases above a certain threshold while a second set of parameters of a second indicative data feature decreases below a certain threshold, a trend indicating on a forthcoming machine failure may be determined.

Figure 8:
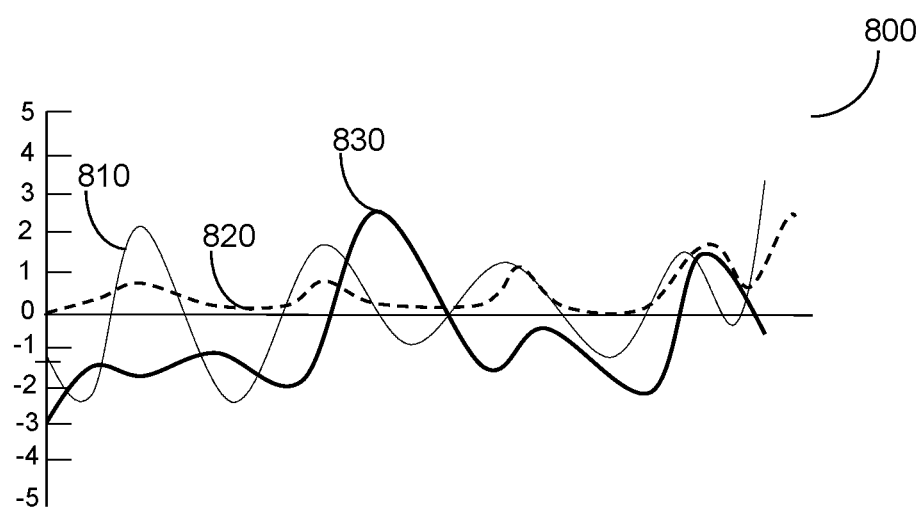
FIG. 8 illustrates representation of selected indicative data features according to an embodiment.

FIG. 8 is an example simulation 800 illustrating representation of selected indicative data features according to an embodiment. The indicative data features represented by curves 810, 820 and 830, may represent three sensory inputs received from one or more sensors of a machine. That is, although there can be many, e.g., 1000, data features associated with the machine operation, only three may be determined to be useful and indicative enough such that a machine learning model may use them as input for predicting a machine failure. The three indicative data features may be selected from a plurality of data features based on their distribution towards a machine failure. That is, by identifying an association and or a correlation between the three data features towards a machine failure, the three data features may be classified as indicative data features.

For example, based on the disclosed method, it may be determined that operating temperature, RPM of a specific axle, and voltage used are indicative data features of a particular machine, whereas time to complete a task and motion detection are non-indicative data features. Thus, only the three indicative data features are monitored, and if some or all of those indicative data features exceed or fall below predetermined threshold, e.g., within a specified time period, a potential upcoming machine failure may be forecast.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for forecasting failures in industrial machines, comprising:

receiving raw sensory inputs collected from at least one machine;

generating a plurality of data features based on the raw sensory inputs;

selecting from the plurality of data features a plurality of indicative data features, wherein the selection is based on a distribution of the plurality of indicative data features that determines an association between the plurality of indicative data features and a machine failure, wherein the distribution of the plurality of indicative data features is a set of abnormal parameters of each of the indicative data features;

selecting, based on the plurality of indicative data features, a machine learning model;

applying the selected machine learning model to the plurality of indicative data features; and determining a probability for a forthcoming machine failure.

2. The method of claim 1, wherein each type of the raw sensory inputs is related to at least a process that is associated with the machine.

3. The method of claim 1, further comprising:
preprocessing the received raw sensory inputs.

4. The method of claim 3, wherein preprocessing includes any of the following processes: data cleansing, normalization, rescaling, re-trending, reformatting, and noise filtering.

5. The method of claim 1, further comprising:
generating a notification for the determined probability of the forthcoming machine failure, wherein the notification indicates the at least one of: the forthcoming machine failure, and at least one recommendation for avoiding or mitigation the determined forthcoming machine failure.

6. The method of claim 1, wherein the selecting of the machine learning model further comprises:
selecting a set of hyperparameters that is optimal for use with the selected machine learning model for optimizing an accuracy level of the machine learning model.

7. The method of claim 6, wherein the selected machine learning model comprises an accurate machine failure prediction capabilities and better long-range predictability of a machine failure with respect to a plurality of machine learning models.

8. The method of claim 1, wherein the determination of the at least a probability is performed on a constant basis.

9. The method of claim 1, wherein the at least one data feature is represented by at least a statistical feature.

10. A non-transitory computer readable medium having stored thereon instructions for causing a processing circuitry to perform a process, the process comprising:
receiving raw sensory inputs collected from at least one machine;
generating a plurality of data features based on the raw sensory inputs;
selecting from the plurality of data features a plurality of indicative data features, wherein the selection is based on a distribution of the plurality of indicative data features that determines an association between the plurality of indicative data features and a machine failure, wherein the distribution of the plurality of indicative data features is a set of abnormal parameters of each of the indicative data features;
selecting, based on the plurality of indicative data features, a machine learning model;
applying the selected machine learning model to the plurality of indicative data features; and
determining a probability for a forthcoming machine failure.

11. A system for forecasting failures in industrial machines, comprising:
a processing circuitry; and
a memory, the memory containing instructions that, when executed by the processing circuitry, configure the system to:
receiving raw sensory inputs collected from at least one machine;
generate a plurality of data features based on the raw sensory inputs;
select from the plurality of data features a plurality of indicative data features, wherein the selection is based on a distribution of the plurality of indicative data features that determines an association between the plurality of indicative data features and a machine failure, wherein the distribution of the plurality of indicative data features is a set of abnormal parameters of each of the indicative data features;
select, based on the plurality of indicative data features, a machine learning model;
apply the selected machine learning model to the plurality of indicative data features; and
determine a probability for a forthcoming machine failure.

12. The system of claim 11, wherein each type of the raw sensory inputs is related to at least a process that is associated with the machine.

13. The system of claim 11, wherein the system is further configured to:
preprocess the received raw sensory inputs.

14. The system of claim 13, wherein preprocessing includes any of the following processes: data cleansing, normalization, rescaling, re-trending, reformatting, and noise filtering.

15. The system of claim 11, wherein the system is further configured to:
generating a notification for the determined probability of the forthcoming machine failure, wherein the notification indicates the at least one of: the forthcoming machine failure, and at least one recommendation for avoiding or mitigation the determined forthcoming machine failure.

16. The system of claim 11, wherein the selecting of the machine learning model further comprises:
selecting a set of hyperparameters that is optimal for use with the selected machine learning model for optimizing an accuracy level of the machine learning model.

17. The system of claim 16, wherein the selected machine learning model comprises an accurate machine failure prediction capabilities and better long-range predictability of a machine failure with respect to a plurality of machine learning models.

18. The system of claim 11, wherein the determination of the at least a probability is performed on a constant basis.

19. The system of claim 11, wherein the at least one data feature is represented by at least a statistical feature.

* * * * *